United States Patent [19]
Okita et al.

[11] Patent Number: 5,612,134
[45] Date of Patent: Mar. 18, 1997

[54] MAGNETIC RECORDING MEDIUM HAVING A CARBON PROTECTIVE LAYER AND A FLUORO-LUBRICANT SUPPLIED FROM A BACKCOAT LAYER

[75] Inventors: Tsutomu Okita; Hideomi Watanabe; Toshio Ishida; Masaki Satake; Hiroshi Hashimoto, all of Odawara, Japan

[73] Assignee: Fuji Photo Film Co., Ltd., Kanagawa, Japan

[21] Appl. No.: 687,796

[22] Filed: Jul. 19, 1996

Related U.S. Application Data

[63] Continuation of Ser. No. 294,348, Aug. 23, 1994, abandoned.

[30] Foreign Application Priority Data

Aug. 24, 1993 [JP] Japan .................................. 5-209479

[51] Int. Cl.$^6$ ........................................................ G11B 5/72
[52] U.S. Cl. ...................... 428/336; 428/408; 428/421; 428/422; 428/457; 428/694 BF; 428/694 BC; 428/694 TC; 428/694 TB; 428/694 TF; 428/900
[58] Field of Search ...................... 428/408, 421, 428/422, 457, 694 TF, 694 BF, 694 BC, 694 TC, 900, 694 TB, 336; 252/58

[56] References Cited

U.S. PATENT DOCUMENTS

| | | | |
|---|---|---|---|
| 2,411,159 | 11/1946 | Hanford | 252/29 |
| 3,525,694 | 8/1970 | Bisschops et al. | 252/62.54 |
| 5,006,410 | 4/1991 | Vogel Viola et al. | 428/411.1 |
| 5,069,973 | 12/1991 | Saito et al. | 428/421 |
| 5,071,715 | 12/1991 | Shoji et al. | 428/694 |
| 5,128,216 | 7/1992 | Ng | 428/695 |
| 5,202,041 | 4/1993 | Traverso et al. | 252/58 |
| 5,344,580 | 9/1994 | von Werner | 252/54 |

*Primary Examiner*—Stevan A. Resan
*Attorney, Agent, or Firm*—Sughrue, Mion, Zinn, Macpeak & Seas

[57] ABSTRACT

A magnetic recording medium having a ferromagnetic metal thin film on at least one surface of a non-magnetic support. The magnetic recording medium has a surface layer containing at least either one of fluorine compounds represented by the following formulae (1) and (2):

$$Rf\text{-}R_1 \qquad \text{Formula (1)}$$
$$Rf\text{-}R_2\text{-}Rf \qquad \text{Formula (2)}$$

where
  Rf: $(CF_3)_a CF_{3-a}(CF_2)_b$
  a: 1 to 3
  a+b: 1 to 11
  $R_1$: an alkyl or alkenyl group having from 8 to 26 carbon atoms
  $R_2$: an alkylene or alkenylene group having from 2 to 14 carbon atoms.

The surface layer may be formed on a carbon film provided on the ferromagnetic metal thin film. The surface layer may further contain a fluorine compound having at least one polar group and a perfluoroalkyl group, and a rust inhibitor. These components may be contained in or coated on a back coat layer. The magnetic recording medium is excellent in running properties, durability and shelf stability.

8 Claims, 1 Drawing Sheet

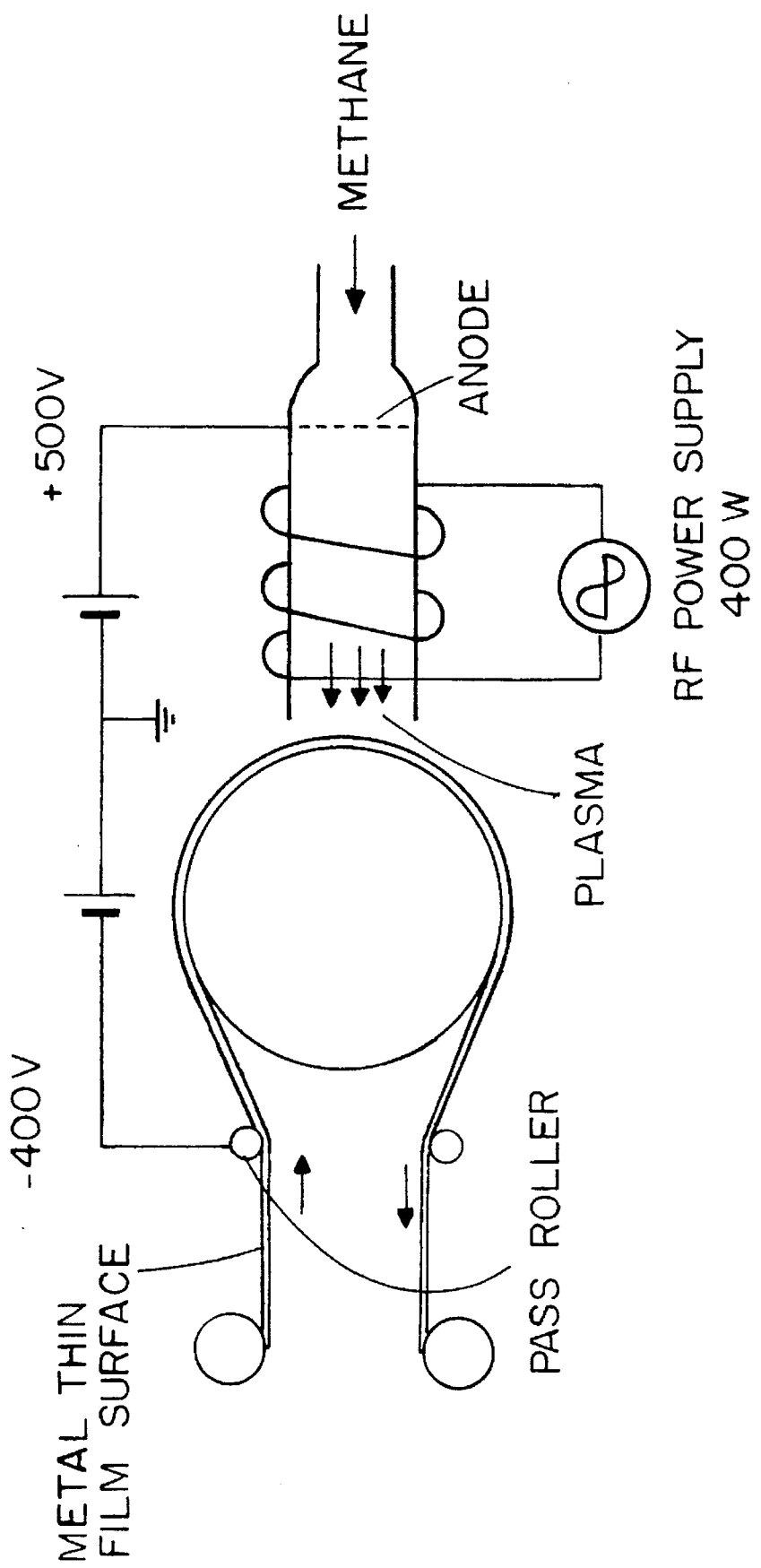

MAGNETIC RECORDING MEDIUM HAVING A CARBON PROTECTIVE LAYER AND A FLUORO-LUBRICANT SUPPLIED FROM A BACKCOAT LAYER

This is a Continuation of application Ser. No. 08/294,348 filed Aug. 23, 1994 now abandoned.

BACKGROUND OF THE INVENTION

The present invention relates to a magnetic recording medium having on a magnetic layer a lubricant layer containing an organic fluorine compound. More particularly, the present invention relates to a metal thin film type magnetic recording medium which is excellent in running properties, durability and shelf stability.

To improve magnetic properties required for high-density magnetic recording, e.g., high-definition recording, digital recording, etc., metal thin film type magnetic recording mediums formed by vapor deposition or the like have been demanded in place of the conventional coating type magnetic recording mediums. However, in a metal thin film type magnetic recording medium, a metal layer, which serves as a recording layer, is formed on the surface of the magnetic recording medium, and the metal layer is usually protected with only an extremely thin oxide layer formed on the metal surface. Thus, the metal thin film type magnetic recording mediums have been demanded to improve markedly in running properties, durability, running durability in repeated use, shelf stability, etc.

Under these circumstances, it has been proposed to coat the surface of the thin film metal layer with various lubricants. For example, Japanese Patent Application Laid-Open (KOKAI) No. 63-9011 (1988) proposes using a perfluorocarboxylic acid perfluoroalkyl ester $C_nF_{2n+1}RCOO(CH_2)_mOC_kF_{2k+1}$. Japanese Patent Application Laid-Open (KOKAI) No. 62-266728 (1987) discloses a magnetic recording medium that uses a carboxylic acid perfluoroalkoxyalkyl ester $RCOO(CH_2)_nOC_mF_{2m+1}$. These lubricants are, however, hydrolytic and hence decomposed during storage for a long time, resulting in a failure to exhibit the required lubricating function. Moreover, the decomposition product may impair running properties and durability. Japanese Patent Application Laid-Open (KOKAI) No. 62-256218 (1987) proposes using a carboxylic acid perfluoroalkyl ester $RCOO(CH_2)_mC_mF_{2m+1}$. Japanese Patent Application Laid-Open (KOKAI) No. 62-236120 (1987) proposes using a carboxylic acid perfluoroalkyl ester and an extreme-pressure additive. Japanese Patent Application Laid-Open (KOKAI) No. 62-236119 (1987) proposes using a carboxylic acid perfluoroalkyl ester and a perfluoro polyether. However, all of these lubricants are hydrolytic and therefore suffer from the same problems as those described above.

Japanese Patent Application Laid-Open (KOKAI) No. 63-298709 (1988) discloses a technique in which $C_nF_{2n+1}(CH_2)_mX$ (X is OH, COOH, or COOR) is mixed with at least one selected from the group consisting of a higher fatty acid, an ester, and an alcohol. Japanese Patent Application Laid-Open (KOKAI) No. 03-241523 (1991) proposes using RfCOOR (Rf is an alkyl group a part of which is fluorine, and R is an alkyl group having not more than 5 carbon atoms). However, these lubricants are compounds having an ester linkage, which are unsatisfactory with regard to running properties at low temperature, suffer from a high coefficient of friction and are lacking in anticorrosion properties. Accordingly, the magnetic recording layer gathers rust during storage for a long time, resulting in the running properties and durability being degraded.

Japanese Patent Application Post-Examination Publication No. 03-19602 (1991) discloses a metal thin film type magnetic recording medium which uses as a lubricant a fluorine-containing surface-active agent, or a fluorine-containing hydrocarbon having a group, e.g., $SO_3Na$, $SO_3K$, $SO_3H$, etc., more specifically, $C_8F_{17}SO_2F$, or perfluoroalkylpolyoxy ethylene having OH, $SO_3M$, or $RfCONH(CH_2)_3$ (RF is a perfluoroalkyl group) at a terminal thereof, i.e., compounds having a terminal betaine structure. With these fluorine compounds, excellent running properties can be obtained, but still durability and shelf stability are not satisfactory. Moreover, these fluorine compounds are insoluble in a hydrocarbon solvent and therefore need a special solvent, e.g., a fluorine-containing solvent, for coating.

Japanese Patent Application Laid-Open (KOKAI) No. 64-72313 (1989) discloses a technique in which a monomolecular film having the structure of Rf-Rh-X, i.e., perfluoroalkyl group—alkyl group—polar group, is formed on a magnetic layer of a thin metal film. With this technique, the μ value is improved, but the formation of a monomolecular film by Langmuir Blodgett (LB) process is inferior in productivity and hence impractical. Further, the magnetic recording medium is inferior in still durability and shelf stability, and the solubility of the lubricant in a hydrocarbon solvent is not insufficient.

Japanese Patent Application Laid-Open (KOKAI) No. 58-100228 (1983) discloses a lubricant with two chains in which a perfluoroalkyl group and an alkyl group are bonded together. The double-chain lubricant ($C_3F_7CH_2CO_2$—) is applied to a coating type magnetic recording medium. However, it is impossible to expect such a lubricant with a short chain length to satisfactorily lower the coefficient of friction when it is used as a protective layer for a magnetic recording layer of a thin metal film. In addition, when applied to a metal thin film type magnetic recording medium, the lubricant suffers from the disadvantages that the corrosiveness is undesirably high, and the coefficient of friction is high. Moreover, it is necessary in order to coat the lubricant to use a coating solution prepared by dissolving the lubricant in a fluorine-containing solvent. Further, since the lubricant itself readily hydrolyzes, the magnetic recording medium using this lubricant cannot be stored for a long period of time.

Japanese Patent Application Laid-Open (KOKAI) No. 62-92227 (1987) discloses a metal thin film type magnetic recording medium which uses an ammonium salt of $Rf(CH_2)_nCOO$ as a fluorine compound lubricant or uses as a lubricant a compound having a fluoroalkyl group having not less than 3 carbon atoms, an aliphatic alkyl group having not less than 8 carbon atoms, and an OH group. These compounds can be dissolved in isopropanol to prepare a coating solution, and thus are advanced lubricants. However, they are still unsatisfactory in terms of such characteristics as μ value, still durability, and shelf stability, and cannot exhibit excellent characteristics under a wide variety of environmental conditions, particularly, over a wide temperature range of from high temperature to low temperature, or a wide humidity range of from high humidity to low humidity.

It has also been proposed to use perfluoroalkyl polyethers and derivatives thereof as lubricants in addition to the above-described lubricants [for example, see Japanese Patent Application Laid-Open (KOKAI) Nos. 60-61918

(1985), 61-107528 (1986), U.S. Pat. No. 3,778,308, Japanese Patent Application Post-Examination Publication No. 60-10368 (1985), U.S. Pat. No. 4,897,211, etc.]. However, these lubricants of fluorine-containing organic compounds suffer from an undesirably high coefficient of friction occurring between the magnetic layer and a sliding member of a magnetic recording and reproducing apparatus during running at low speed and therefore cannot impart satisfactory running properties to the magnetic layer. The lubricants are also unsatisfactory with regard to shelf stability; the magnetic layer may peeled off due to corrosion by an acidic gas, e.g., sulfurous acid gas, which may result from acid rain. Accordingly, no practicable magnetic recording medium can be obtained with these lubricants.

Fatty acids and fatty acid esters [for example, see Japanese Patent Application Post-Examination Publication Nos. 28-28367 (1953), 51-39081 (1976), 51-30981 (1976), Japanese Patent Application Laid-Open (KOKAI) Nos. 56-80828 (1981), 61-24017 (1986), etc.] suffer from an undesirably high coefficient of friction occurring between the magnetic layer and a magnetic head and are also unsatisfactory with regard to the resistance to corrosion by an acidic gas, e.g., sulfurous acid gas.

Further, most of the above-described lubricants are generally inferior in solubility in hydrocarbon-containing organic solvents and soluble in only fluorine-containing organic solvents. Therefore, a fluorine-containing organic solvent must be used to coat a conventional lubricant on a magnetic recording layer as a protective layer. Fluorine-containing organic solvents are costly and causative agents that destroy the ozone layer. Thus, fluorine-containing organic solvents have serious problems from the viewpoint of protecting natural environment, and also suffer from the problem that they have an adverse effect on the manufacturing system and deteriorate the working atmosphere.

The present invention provides a lubricant which is soluble in a hydrocarbon-containing organic solvent, thereby solving the problems arising from the use of a fluorine-containing solvent, and which imparts running properties, durability and shelf stability to a metal thin film type magnetic recording medium obtained by a vapor deposition, sputtering or the like, whereby the recording density is markedly improved.

It is an object of the present invention to provide a magnetic recording medium, for example, a high-density recording medium, particularly, a metal thin film type magnetic recording medium capable of markedly improving the recording density, which is given running properties, durability, repeated running durability, and shelf stability.

It is another object of the present invention to provide a magnetic recording medium for a cam coder useful for outdoor use.

It is still another object of the present invention to provide a magnetic recording medium capable of exhibiting satisfactory running properties and durability under various environmental conditions, i.e., over a wide temperature range and a wide humidity range.

It is a further object of the present invention to provide a method of producing a magnetic recording medium using a lubricant which is soluble in a hydrocarbon-containing organic solvent so that it is unnecessary to use a fluorine-containing organic solvent, and thus the production method is free from environmental pollution.

SUMMARY OF THE INVENTION

The present invention provides a magnetic recording medium having a magnetic layer on at least one surface of a non-magnetic support, wherein the improvement has a surface layer containing a fluorine-containing compound represented by the following formula (1) or (2):

$$Rf-R_1 \quad \text{Formula (1)}$$

$$Rf-R_2-Rf \quad \text{Formula (2)}$$

where

Rf: $(CF_3)_a CF_{3-a}(CF_2)_b$ a: 1 to 3 a+b: 1 to 11

$R_1$: an alkyl or alkenyl group having from 8 to 26 carbon atoms $R_2$: an alkylene or alkenylene group having from 2 to 14 carbon atoms.

In addition, the present invention provides a magnetic recording medium as described above, wherein the magnetic layer is a ferromagnetic metal thin film.

In addition, the present invention provides a magnetic recording medium as described above, wherein the surface layer is made of the fluorine-containing compound supplied from a back coat layer formed on the non-magnetic support.

In addition, the present invention provides a magnetic recording medium as described above, wherein the surface layer is formed on a carbon protective film.

In addition, the present invention provides a magnetic recording medium, wherein the surface layer further contains a compound which has at least one polar group selected from the group consisting of a carboxylic acid group, a $SO_3M$ group, a phosphoric acid group, and a phosphorous acid group, and an alkyl group, or a perfluoroalkyl group, or an alkyl group having a perfluoroalkyl group as a substituent, which gives at least 10 carbon atoms in total, exclusive of the polar group.

BRIEF DESCRIPTION OF THE DRAWINGS

The attached sole FIGURE illustrates a method of forming a carbon film on a thin film metal layer.

DESCRIPTION OF THE PREFERRED EMBODIMENT

The fluorine-containing compound in the present invention has a perfluoroalkyl group at a terminal of a molecule thereof and contains in the molecule no polar group such as serves as an anchor group adsorbed on a ferromagnetic metal thin film. Accordingly, there is substantially no interaction between molecules. Therefore, the fluorine-containing compound is not adsorbed on the ferromagnetic metal thin film. Thus, no boundary lubrication effect is provided. For this reason, there is substantially no effect on the coefficient of friction during low-speed running in a normal state for feeding tape. However, during high-speed running as in the still mode (i.e., still-picture mode), it is rather preferable for the molecules to move freely to thereby absorb energy concentrated on the interface between the surface of the magnetic layer and the magnetic head; therefore, the fluorine-containing compound having the above-described molecular structure exhibits advantageous effect. Since the tape remains stationary in the still mode, the improvement in characteristics in the still mode is usually classified into durability rather than running properties as being "still durability" or the like.

The present invention is characterized in that a novel perfluoroalkyl-hydrocarbon direct-coupled type compound, which has heretofore rarely been considered from the viewpoint of molecular structure, is used as a lubricant for the purpose of improving durability, which is one of practical problems of ferromagnetic metal thin film magnetic recording mediums.

The feature of the above-described compound of the present invention resides in that since it is retained by the magnetic layer with weak force due to lack of polar group, the fluorine-containing compound is adapted to be also retained by a back coat layer, which is a coating film having a large number of fine voids capable of accommodating the compound, thereby enabling the fluorine-containing compound to be continuously supplied over the surface of the magnetic layer.

Further, since the fluorine-containing compound of the present invention has a hydrocarbon group as a part thereof, it can be dissolved in a hydrocarbon solvent to prepare a coating solution. In addition, since the van der Waals force of the hydrocarbon group induces moderate interaction between molecules, the durability can be improved furthermore.

Further, the magnetic recording medium is characterized in that the surface layer is formed on a carbon protective film.

Further, the magnetic recording medium is characterized in that the surface layer further contains a compound which has at least one polar group selected from the group consisting of a carboxylic acid group, a $SO_3M$ group, a phosphoric acid group, and a phosphorous acid group, and an alkyl group, or a perfluoroalkyl group, or an alkyl group having a perfluoroalkyl group as a substituent, which gives at least 10 carbon atoms in total, exclusive of the polar group.

In the magnetic recording medium of the present invention, it is even more preferable to satisfy the following conditions:

a: 1 to 2, a+2: 2 to 9

$R_1$: an alkyl or alkenyl group having from 10 to 20 carbon atoms $R_2$: an alkylene or alkenylene group having from 4 to 10 carbon atoms If Rf exceeds the upper limit of the above range, the solubility of the compound in a solvent becomes insufficient, and satisfactory running properties cannot be obtained.

If Rf is smaller than the lower limit of the above range, durability, particularly still durability becomes insufficient.

In a case where $R_1$ is larger than 20, or $R_2$ is larger than 10, durability becomes unfavorable. Particularly, the output lowers to a considerable extent. In a case where $R_1$ is smaller than 10, or $R_2$ is smaller than 4, the solubility of the compound in a solvent becomes insufficient, or the volatility rises undesirably. Thus, satisfactory characteristics cannot be exhibited.

Specific examples of compounds of the formula (1) are as follows:

$C_8F_{17}C_{10}H_{21}$ $C_6F_{13}C_8H_{17}$ $C_4F_9C_{22}H_{45}$
$C_8F_{17}C_{14}H_{29}$ $C_{10}F_{21}C_8H_{17}$ $C_8F_{17}C_{18}H_{37}$
$(CF_3)_2CFC_{14}H_{29}$ $(CF_3)_3CC_{18}H_{37}$
$(CF_3)_2CFC_5F_{10}C_{10}H_{21}$ $(CF_3)_2CF(CF_2)_7C_{19}H_{39}$
$C_8F_{17}C_3H_6CH=CHC_3H_7$ $C_6F_{13}CH=CHC_{10}H_{21}$
$(CF_3)_2CFCF_2C_{14}H_{29}$ $(CF_3)_2CFC_6F_{12}C_{18}H_{37}$

Specific examples of compounds of the formula (2) are as follows:

$C_8F_{17}C_8H_{16}C_8F_{17}$ $C_6F_{13}C_8H_{16}C_6F_{13}$
$C_4F_9C_8H_{16}C_4F_9$ $C_8F_{17}C_{10}H_{20}C_8F_{17}$
$C_8F_{17}C_{14}H_{28}C_8F_{17}$ $C_{10}F_{21}C_2H_4C_{10}F_{21}$
$C_8F_{17}C_8H_{16}C_6F_{13}$ $C_6F_{13}C_2H_4CH=CHC_2H_4C_6F_{13}$
$(CF_3)_2CFC_8H_{16}CF(CF_3)_3$
$(CF_3)_2CFC_2F_4C_8H_{16}C_2F_4CF(CF_3)_3$
$(CF_3)_2CF(CF_2)_7C_8H_{16}(CF_2)_7CF(CF_3)_2$

The fluorine-containing compounds of the formula (1) may be obtained as follows: A perfluoroalkyl iodide and a vinyl compound ($CF_2=CHR$) having an unsaturated linkage at a terminal thereof are allowed to undergo radical reaction in the presence of azobisisobutyronitrile (AIBN) to obtain $RfCH_2CHIR$, and hydrogen iodide is added thereto in the presence of zinc, thereby obtaining $RfCH_2CH_2R$. It should be noted that such synthesis methods are described, for example, in J. Org. Chem, 27, 4491 (1962). The compounds of the formula (2) may be obtained by using a divinyl compound, that is, a compound having two vinyl groups at both terminals, respectively, in place of the above-described vinyl compound, thereby adding perfluoroalkyl groups to both terminals, respectively.

Further, the magnetic recording medium of the present invention may use a lubricant which contains a fluorine-containing compound of the formula (1) or (2) in combination with a compound having both a polar group and a perfluoroalkyl group. The use of such a lubricant enables the lowering in the output to be further reduced and makes it possible to obtain a magnetic recording medium capable of maintaining excellent electromagnetic transducing characteristics even when it is repeatedly run.

Preferable examples of compounds having both a polar group and a perfluoroalkyl group are those which have a perfluoroalkyl group at a terminal thereof and a polar group, which is represented by X, at the other terminal and which has an alkyl group of hydrocarbon in the middle between the two terminals, such as $C_nF_{2n+1}C_mH_{2m}X$. The perfluoroalkyl group preferably has from 4 to 12 carbon atoms, and it may be a terminal branched perfluoroalkyl group $(CF_3)_2CF-$. The hydrocarbon group in the middle preferably has from 6 to 20 carbon atoms. X is one selected from the group consisting of OH, COOH, $SO_3M$, a phosphoric acid group, a phosphorous acid group, and an unsaturated group of hydrocarbon. Among them, COOH, a phosphoric acid group, and a phosphorous acid group are preferably used. Alternatively, X may be a compound containing an unsaturated linkage at a terminal thereof:

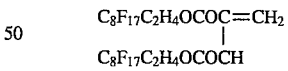

It is also possible to use a rust inhibitor in combination with the lubricant of the present invention. An aromatic compound containing a nitrogen atom or a sulfur atom is preferably used as a rust inhibitor. Examples of such compounds are those which have triazole, pyrazole, imidazole, thiazole, pyridazine, pyrimidine, pyrazine, triazine, purine, cinnoline and quinoxaline rings. Particularly preferable compounds are those which have triazole, thiazones, tetrazindene and uracil rings.

By using one of these compounds in combination with the compound of the present invention, the lowering in the output is further reduced, and excellent electromagnetic transducing characteristics are satisfactorily maintained even when the magnetic recording medium is repeatedly run.

It is presumed that since the compound having both a polar group and a perfluoroalkyl group is firmly adsorbed on the magnetic layer or the carbon protective layer by the polar group, the fluorine-containing compound of the present invention is prevented from falling off from the surface layer during running by the interaction between the hydrocarbon group portion of the adsorbed compound and the hydrocarbon group portion of the fluorine-containing compound of the present invention.

The ferromagnetic metal thin film of the metal thin film type magnetic recording medium according to the present invention may be formed by a vacuum film forming method, e.g., vacuum deposition, ion plating, sputtering, CVD, etc. The film may be formed in a single-layer structure, a parallel multilayer structure, a non-parallel multilayer structure, etc. Examples of usable metallic materials are iron, cobalt, nickel, and cobalt-containing alloys, e.g., cobalt-nickel alloy, cobalt-chromium alloy, cobalt-platinum alloy, iron-cobalt alloy, etc.

Co—O or CoNi—O ferromagnetic metal thin film, which is evaporated in an atmosphere containing a trace amount of oxygen with cobalt or cobalt-nickel alloy used as an evaporation source, is particularly preferable because it has a good balance between magnetic properties, electromagnetic transducing characteristics, weatherability, and durability. The thickness of the magnetic layer is preferably in the range of from 0.1 μm to 0.3 μm.

If the magnetic thin film is composed of a CoNi alloy in which the ratio of nickel to cobalt is relatively high, crystallographic ununiformity is large, and there are therefore many active points where the polar groups are readily adsorbed. Accordingly, a polar group-containing organic compound used to form a protective layer is also readily adsorbed on the magnetic film. If the proportion of cobalt is increased in order to improve magnetic properties and electromagnetic transducing characteristics, however, the number of such active points decreases, and it becomes difficult for the protective layer material to be adsorbed on the magnetic film. However, by using a compound containing both a polar group and a perfluoroalkyl group in combination with the compound of the present invention, the adsorptivity of the lubricant becomes even more excellent, so that even if the proportion of cobalt is relatively high, the protective layer material is readily adsorbed on the magnetic film. Thus, the protecting effect is unlikely to deteriorate.

The proportion of cobalt is preferably not less than 90% by weight, more preferably not less than 95% by weight. The magnetic film may contain nickel, chromium, etc. in addition to cobalt.

The lubricant of the present invention may be applied to the metal thin film magnetic layer by coating or other similar method after the formation of a carbon protective film which is obtained by supplying a carbon compound by plasma CVD or the like.

The carbon protective film may be formed by a method, for example, a plasma CVD method using hydrocarbon as a raw material, or a sputtering method using a carbon target. The carbon film may have any structure selected from among amorphous, graphite and diamond structures, and a mixture of these structures. However, it is preferable to form a rigid carbon film which is generally known as "diamond-shaped carbon" with a view to obtaining a hardness sufficient for the carbon film to function as a protective film. If the diamond-shaped carbon film is excessively thin, durability becomes insufficient, whereas, if the film is excessively thick, thickness loss is produced at the magnetic head during recording or playback. Therefore, the film thickness is preferably in the range of from 5 nm to 25 nm, particularly preferably from 8 nm to 20 nm, and even more preferably from 8 nm to 15 nm. The diamond-shaped carbon film can be formed by an ion beam method, ionized cluster beam evaporation, plasma CVD, sputtering, ion plating, photo-assisted CVD, ECR plasma CVD, etc.

To form a carbon film by plasma CVD, a film-forming gas is sprayed on the ferromagnetic metal thin film. In this case, the film-forming gas is formed into a plasma by a plasma generating apparatus and then sprayed on the ferromagnetic metal thin film by a gas pressure difference and an electric potential difference.

There is no particular restriction on the material used to form a carbon film, that is, the film-forming gas that is formed into a plasma. However, examples of preferable materials are hydrocarbon, ketone and alcohol gases. In general, such a film-forming gas is introduced into the plasma generating apparatus at a partial pressure in the range of from 0.1 to 0.001 Torr, preferably from 0.05 to 0.02 Torr. It is preferable to introduce the gas in the form of a mixture of a hydrocarbon such as methane and argon. In general, the ratio of hydrocarbon to argon is preferably in the range of from 6:1 to 2:1.

The non-magnetic support is preferably a synthetic resin film having a thickness of 5 μm to 15 μm. Examples include polyethylene terephthalate, polyethylene naphthalate, polyimide, polyamide, polyamide-imide, polyethylene, polypropylene, polyvinyl chloride, polyvinylidene chloride, etc. The thickness of the magnetic layer is preferably in the range of from 0.1 μm to 0.3 μm.

With a view to improving durability, running and other properties of the magnetic recording medium, it is preferable to impart appropriate surface roughness to the surface of the non-magnetic support. It is possible to adopt a known technique in this technical field. For example, wrinkle-like protrusions, conical protrusions, granular protrusions, etc. may be provided on the surface of the non-magnetic support.

In addition, it is useful for further improving running properties, durability, and so forth to provide the magnetic recording medium with a back coat layer and an undercoat layer for the magnetic layer.

It is also possible to use another lubricant in combination with the lubricant of an organic fluorine-containing compound according to the present invention. Examples of a lubricant jointly used in the present invention include a perfluoro polyether represented by the following formula, and compounds obtained by modifying the terminal of the perfluoro polyether with OH, COOH, etc.:

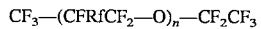

$CF_3-(CFRfCF_2-O)_n-CF_2CF_3$

Rf in the above formula is $CF_3$ or F, and the molecular weight is in the range of from 1,000 to 20,000, preferably from 2,500 to 10,000. Specific examples are KRYTOX K143AZ and K157FSL, manufactured by Du Pont Co., Ltd., FOMBLIN AM2001, manufactured by Montefluos, DEMNUMS-SY, manufactured by Daikin Kogyo Co., Ltd., and so forth.

The coating weight of the lubricant in the magnetic recording medium of the present invention is preferably in the range of from 10 to 50 mg/m$^2$, particularly preferably from 3 to 30 mg/m$^2$. Although the lubricant of the present invention is less corrosive, the corrosion resistance can be enhanced by using a rust inhibitor in combination with the lubricant. As a rust inhibitor, an aromatic compound containing a nitrogen atom or a sulfur atom is preferably used. Examples include compounds which have triazole, pyrazole, imidazole, thiazole, pyridazine, pyrimidine, pyrazine, triazine, purine, cinnoline and quinoxaline rings. It is particularly preferable to use as a rust inhibitor a nitrogen-containing heterocyclic compound which has an OH group or a SH group and in which a hydrocarbon group having at least 3 carbon atoms is substituted. Particularly, a rust inhibitor consisting essentially of a tetrazinedene cyclic compound and/or a thiouracil cyclic compound is preferably used. By containing such a rust inhibitor, the magnetic recording medium can be improved in the characteristics required therefor.

Examples of tetrazinedene cyclic compounds usable for this purpose are those which are represented by the following formula:

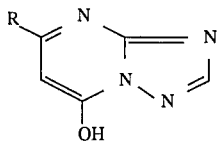

where R is a hydrocarbon group selected from the group consisting of an alkyl group, an alkoxy group, and an alkylamide group.

Tetrazinedene cyclic compounds having from 3 to 26 carbon atoms are particularly preferable. In the case of an alkoxy group, R in ROCOCH$_2$— may be C$_3$H$_7$—, C$_6$H$_{13}$—, or phenyl. In the case of an alkyl group, R may be C$_6$H$_{13}$—, C$_9$H$_{19}$—, or C$_{17}$H$_{35}$—. In the case of an alkylamide group, R in RNHCOCH$_2$ may be phenyl, or C$_3$H$_7$—.

Examples of thiuracil cyclic compounds are those which are represented by the following formula:

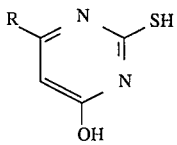

It is also possible to use the following benzothiazole derivatives:

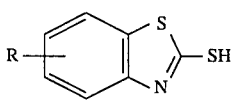

where R is a hydrocarbon group having at least 3 carbon atoms.

The coating weight of the rust inhibitor is preferably in the range of from 0.01 to 5.0 mg/m$^2$ with respect to 1.0 to 50 mg/m$^2$ of lubricant, particularly preferably in the range of from 0.1 to 10 mg/m$^2$ with respect to 3 to 30 mg/m$^2$ of lubricant.

The lubricant used for the magnetic recording medium of the present invention is dissolved in an organic solvent, and the resulting solution is coated on the surface of the magnetic layer by an ordinary coating method using a coil bar, for example. Since the fluorine-containing compound of the present invention is soluble in at least one ordinary hydrocarbon solvent selected from the group consisting of acetone, methyl ethyl ketone, methyl isobutyl ketone, cyclohexanone, methanol, ethanol, and isopropanol, it can be coated and dried to produce a magnetic recording medium without using a fluorine-containing organic solvent. It is preferable to transfer the fluorine-containing compound to the surface layer from the back coat layer formed on the non-magnetic support by winding up the magnetic recording medium. The back coat layer may be impregnated with the fluorine-containing compound by coating the fluorine-containing compound on the back coat layer formed in advance to thereby retain the fluorine-containing compound in fine voids present in the coating film constituting the back coat layer. Alternatively, the fluorine-containing compound may be mixed in the back coat layer coating solution when the back coat layer is formed. With such a method, the fluorine-containing compound which disappears from the surface layer as the magnetic recording medium is run is supplied from the back coat layer when the magnetic recording medium is wound up. Therefore, there is substantially no change in the quantity of fluorine-containing compound present in the surface layer during repeated running. Thus, excellent running durability can be obtained.

When a fluorine-containing lubricant, which is excellent in lubricating properties, is coated on the magnetic layer, even if the lubricant is soluble in an organic solvent, fine coating unevenness is likely to occur during drying after coating. However, the method wherein the fluorine-containing compound is transferred from the back coat layer has advantages in that since the fluorine-containing compound is transferred from the back coat layer to the magnetic layer side by contact occurring when the magnetic recording medium is wound up, coating unevenness is less likely to occur than in the case where the fluorine-containing compound is coated on the surface layer, and that precipitation of the lubricant is also unlikely to occur.

The quantity of fluorine-containing compound mixed in the back coat layer or coated on the surface thereof is preferably in the range of from 10 mg/m$^2$ to 200 mg/m$^2$. If the quantity of fluorine-containing compound in the back coat layer is excessively small, the quantity of fluorine-containing compound supplied to the surface of the magnetic layer is insufficient, causing the repeated running durability to be degraded. If the rate of the fluorine-containing compound present in the back coat layer is excessively high, the coefficient of static friction of the magnetic layer surface and the back coat layer surface rises, causing jitter or a running failure when the magnetic recording medium is run on a VTR.

The magnetic recording medium of the present invention uses a lubricant consisting essentially of a fluorine-containing compound which has both a perfluoroalkyl group and a hydrocarbon group and which contains no group that may be decomposed by hydrolysis, e.g., an ester group, as a group coupling together the two groups. Thus, the two groups are directly coupled together. Therefore, there is no likelihood that the lubricant will be decomposed by the metal contained in the magnetic layer or a head member of a magnetic recording and reproducing apparatus. Accordingly, it is possible to obtain a magnetic recording medium which is superior in shelf stability, running properties, and durability. In addition, if a compound which has both an adsorptive polar group and a perfluoroalkyl group is used in combination with the fluorine-containing compound, the adsorptivity with respect to the magnetic layer and a carbon protective layer can be improved, and it is possible to prevent the lubricant from falling off from the surface of the metal thin film. If the back coat layer is impregnated with the lubricant, the lubricant can be continuously supplied to the surface layer even when the magnetic recording medium is repeatedly run for a long period of time.

Although the present invention is most effective in a case where the magnetic layer is a ferromagnetic metal thin film, it is also effective in the case of a coating type magnetic layer which is composed mainly of a ferromagnetic metal powder and a binder resin. In the case of a magnetic recording medium having a coating type magnetic layer, the surface layer of the present invention may be formed by mixing the fluorine-containing compound in a coating solution containing a ferromagnetic metal powder and a binder resin, or coating the fluorine-containing compound on the coating type magnetic layer formed. It is also possible to transfer the fluorine-containing compound to the surface layer from the back coat layer which has previously been impregnated with it.

EXAMPLES

A cobalt-nickel magnetic film was deposited on a polyethylene terephthalate film of 7 μm in thickness by oblique-incidence vapor deposition to form a magnetic metal thin film layer of 150 nm in thickness. The vapor deposition was carried out as follows: A cobalt-nickel alloy (Co: 90 wt %; and Ni: 10 wt %) was evaporated by an electron beam, and oblique-incidence vapor deposition was performed at an incidence angle of 50 degrees with oxygen gas being introduced under a vacuum of $6.7 \times 10^{-3} N/m^2$. Next, as shown in FIG. 1, a carbon film of 8 nm in thickness was formed on the metal thin film layer by an RF plasma CVD method using methane as a raw material. As the RF power, 400 W was applied to produce a plasma. The plasma was accelerated by applying a DC voltage of −400 V to the magnetic layer surface through a pass roller and further applying a DC voltage of +500 V to an anode installed in the gas inlet, thereby forming a carbon film on the surface of the magnetic layer. Each of the lubricants shown in Tables 1 and 2 was coated on the magnetic recording medium thus obtained using a coil bar and then dried. Further, a back coat layer was formed on a surface of the non-magnetic support where no metal thin film was formed by using a back coat layer coating solution having the following composition. Then, the magnetic recording medium was slit into a tape of 8 mm in width, thus preparing a magnetic recording tape as a sample.

[Back coat layer coating solution]

| Carbon black | 100 parts by weight |
| Particle size: 18 nm | |
| Nitrocellulose | 60 parts by weight |
| RSI/2H (manufactured by Daicel Ltd.) | |
| Polyurethane | 60 parts by weight |
| N-2301 (manufactured by Nippon Polyurethane Co., Ltd.) | |
| Polyisocyanate | 20 parts by weight |
| Coronate L (manufactured by Nippon Polyurethane Co., Ltd.) | |

[Back coat layer coating solution]

| Methyl ethyl ketone | 1,000 parts by weight |
| Toluene | 1,000 parts by weight |

Examples and Comparative Examples are shown in Tables 1 and 2, together with the results of evaluation made by the following methods. Comparative Examples are denoted by Comp. Ex., and still durability is referred to as simply "still".

Evaluation Method

① Measurement of Coefficient of Friction

Each sample of magnetic tape thus obtained was wound around a stainless steel pole at a winding angle of 180° under a tension ($T_1$) of 50 g. A tension ($T_2$) required for running the sample at a speed of 3.3 cm/sec. under the above-described condition was measured. The friction coefficient μ of the magnetic tape was determined from the following formula on the basis of the measured value:

$$\mu = 1/\pi \cdot ln(T_2/T_1)$$

The measurement of the friction coefficient was carried out at 23° C. and 70% RH under two different conditions: A) before storage; and B) after storage for 7 days at 60° C. and 90% RH.

② Measurement of Still Durability

Each sample tape was subjected to video recording by using an 8-mm VTR (HI8 FH125SW, a product of Fuji Photo Film Co., Ltd.). Then, the recorded image was reproduced in the still playback mode with the still playback limiting mechanism left inoperative, and a time taken until the playback output reached −3 dB with respect to the initial output was measured to evaluate the still durability.

The test for the still durability was carried out at 5° C. and 10% RH under two different conditions: A) before storage; and B) after storage for 7 days at 60° C. and 90% RH.

③ Measurement of Clogging and Lowering in the Output

A signal of 7 MHz was recorded on each sample of video tape by using the same 8-mm VTR as that used to measure still durability, and the recorded signal was reproduced 100 times at 23° C. and 10% RH. With the initial playback output in the first running pass defined as 0 dB, the output was measured for each playback running pass until 100 running passes were repeatedly made, thereby evaluating occurrence of clogging and a lowering in the playback output from the initial output.

TABLE 1

| Sample No. | Lubricants and other substances used | Coating weight mg/m² | Items of evaluation and results of measurement | |
| --- | --- | --- | --- | --- |
| 1 | $C_8F_{17}C_{14}H_{29}$ | 5 | Still before storage | at least 30 min |
| | | | after storage | at least 30 min |
| | | | Clogging | not occurred |
| | | | Output change (dB) | −0.7 |
| 2 | $C_9F_{19}C_{20}H_{41}$ | 5 | Still before storage | at least 30 min |
| | | | after storage | at least 30 min |
| | | | Clogging | not occurred |
| | | | Output change (dB) | −0.8 |
| 3 | $(CF_3)_2CFC_{10}H_{21}$ | 5 | Still before storage | at least 30 min |
| | | | after storage | at least 30 min |
| | | | Clogging | not occurred |

TABLE 1-continued

| Sample No. | Lubricants and other substances used | Coating weight mg/m$^2$ | Items of evaluation and results of measurement | |
|---|---|---|---|---|
| 4 | $C_3F_7C_{10}H_{20}C_3F_7$ | 5 | Output change (dB) | −0.8 |
| | | | Still before storage | at least 30 min |
| | | | after storage | at least 30 min |
| | | | Clogging | not occurred |
| 5 | $C_8F_{17}C_4H_8C_8F_{17}$ | 5 | Output change (dB) | −0.8 |
| | | | Still before storage | at least 30 min |
| | | | after storage | at least 30 min |
| | | | Clogging | not occurred |
| 6 | $C_8F_{17}C_{14}H_{29}$ | 5 | Output change (dB) | −0.9 |
| | $C_8F_{17}C_{10}H_{20}COOH$ | 5 | Still before storage | at least 30 min |
| | | | after storage | at least 30 min |
| | | | Clogging | not occurred |
| 7 | $C_8F_{17}C_{14}H_{29}$ | 5 | Output change (dB) | −0.3 |
| | Back coat layer was formed by adding 10 parts of $C_8F_{17}C_{14}H_{29}$ to coating solution | | Still before storage | at least 30 min |
| | | | after storage | at least 30 min |
| | | | Clogging | not occurred |
| 8 | $C_8F_{17}C_{14}H_{29}$ | 5 | Output change (dB) | −0.3 |
| | $C_8F_{17}C_2H_4PO_3H_2$ | 5 | Still before storage | at least 30 min |
| | | | after storage | at least 30 min |
| | | | Clogging | not occurred |
| | | | Output change (dB) | −0.3 |
| 9 | $C_8F_{17}C_{14}H_{29}$ | 5 | Still before storage | at least 30 min |
| | $C_8F_{17}C_2H_4OCOC{=}CH_2$ | 5 | after storage | at least 30 min |
| | $\|$ | | Clogging | not occurred |
| | $C_8F_{17}C_2H_4OCOCH$ | | Output change (dB) | −0.3 |
| Comp. Ex. 1 | $C_8F_{17}COOC_{10}H_{21}$ | 5 | Still before storage | 18 min |
| | | | after storage | 5 min |
| | | | Clogging | not occurred |
| | | | Output change (dB) | −0.3 |
| Comp. Ex. 2 | Perfluoro polyether KRYTOX K143AZ (Du Pont Co., Ltd.) | 5 | Still before storage | 2 min |
| | | | after storage | not measured |
| | | | Clogging | Occurred in 5th running pass |
| | | | Output change (dB) | Unmeasurable |
| Comp. Ex. 3 | $C_8F_{17}C_{10}H_{20}COOH$ | 5 | Still before storage | 1 min |
| | | | after storage | not tested |
| | | | Clogging | Occurred in 3rd running pass |
| | | | Output change (dB) | Unmeasurable |
| Comp. Ex. 4 | $C_2F_5C_6H_{13}$ | 5 | Still before storage | 20 min |
| | | | after storage | 1 min |
| | | | Clogging | Occurred in 38th running pass |
| | | | Output change (dB) | Unmeasurable |
| Comp. Ex. 5 | $C_{13}F_{27}C_{18}H_{36}C_{13}F_{27}$ | 5 | Still before storage | Could not be coated because of insufficient solubility in organic solvent |
| | | | after storage | |
| | | | Clogging | |
| | | | Output change (dB) | |
| Comp. Ex. 6 | $C_8F_{17}COOC_{10}H_{20}C_8H_{17}$ | 5 | Still before storage | at least 30 min |
| | | | after storage | 2 min |
| | | | Clogging | Occurred in 44th running pass |
| | | | Output change (dB) | Unmeasurable |
| Comp. Ex. 7 | $C_8H_{17}COOC_{10}F_{21}$ | 5 | Still before storage | at least 30 min |
| | | | after storage | 1 min |
| | | | Clogging | Occurred in 29th running pass |
| | | | Output change (dB) | Unmeasurable |

As has been described above, the magnetic recording medium of the present invention uses a lubricant which has both a perfluoroalkyl chain and a hydrocarbon chain, which are directly coupled together without a coupling group which may be decomposed, such as an ester group. Therefore, there is no likelihood that the lubricant will be decomposed by the metal contained in the magnetic layer or a head member of a magnetic recording and reproducing apparatus. Thus, it is possible to obtain a magnetic recording medium which is superior in shelf stability, durability, and running properties. If a compound which has both a polar group having adsorptivity with respect to the magnetic layer and a perfluoroalkyl group in combination with the lubricant, durability is further improved by the interaction between the hydrocarbon group portion of the adsorbed compound and the hydrocarbon group portion of the lubricant of the present invention. In addition, since the lubricant has both a perfluoroalkyl chain and a hydrocarbon portion in one molecule, the solubility in a hydrocarbon-containing organic solvent improves, and it becomes possible to form a protective layer by using a hydrocarbon-containing organic solvent. In addition, if the back coat layer is impregnated with the fluorine-containing lubricant of the present invention, the surface layer and the back coat layer come in contact with each other when the tape is wound up, and the lubricant which falls off from the surface layer during running can be properly supplied from the back coat layer to which the lubricant is attached by relatively weak interaction, thus enabling the required lubricating properties to be maintained for a long period of time.

What we claim is:

1. A magnetic recording medium having a Co—Ni alloy thin film magnetic layer on at least one surface of a non-magnetic support, wherein the improvement comprises a surface layer formed on a carbon protective film having a thickness of from 5 to 25 nm, said surface layer containing a fluorine-containing compound supplied from a back coat layer formed on said non-magnetic support, and said fluorine-containing compound represented by the following formula (1) or (2):

$$Rf-R_1 \quad \text{Formula (1)}$$

$$Rf-R_2-Rf \quad \text{Formula (2)}$$

where

Rf: $(CF_3)_a CF_{3-a}(CF_2)_b$ a: 1 to 3 a+b: 1 to 11

$R_1$: an alkyl or alkenyl group having from 8 to 26 carbon atoms $R_2$: an alkylene or alkenylene group having from 2 to 14 carbon atoms.

2. A magnetic recording medium according to claim 1, wherein said surface layer further contains a compound which has at least one polar group selected from the group consisting of a carboxylic acid group, a $SO_3M$ group, a phosphoric acid group, and a phosphorous acid group, and an alkyl group, or a perfluoroalkyl group, or an alkyl group having a perfluoroalkyl group as a substituent, which gives at least 10 carbon atoms in total, exclusive of said polar group.

3. A magnetic recording medium according to claim 1, wherein said fluorine-containing compound is represented by formula (1).

4. A magnetic recording medium according to claim 3, wherein said fluorine-containing compound is selected from the group consisting of:

$C_8F_{17}C_{10}H_{21}$; $C_6F_{13}C_{H17}$; $C_4F_9C_{22}H_{45}$; $C_8F_{17}C_{14}H_{29}$; $C_{10}F_{21}C_8H_{17}$; $C_8F_{17}C_{18}H_{37}$; $(CF_3)_2CFC_{14}H_{29}$; $(CF_3)_3CC_{18}H_{37}$; $(CF_3)_2CFC_5F_{10}C_{10}H_{21}$; $(CF_3)_2CF(CF_2)_7C_{19}H_{39}$; $C_8F_{17}C_3H_6CH=CHC_3H_7$; $C_6F_{13}CH=CHC_{10}H_{21}$; $(CF_3)_2CFCF_2C_{14}H_{29}$; and $(CF_3)_2CFC_6F_{12}C_{18}H_{37}$.

5. A magnetic recording medium according to claim 1, wherein said fluorine-containing compound is represented by formula (2).

6. A magnetic recording medium according to claim 5, wherein said fluorine-containing compound is selected from the group consisting of:

$C_8F_{17}C_8H_{16}C_8F_{17}$; $C_6F_{13}C_8H_{16}C_6F_{13}$; $C_4F_9C_8H_{16}C_4F_9$; $C_8F_{17}C_{10}H_{20}C_8F_{17}$; $C_8F_{17}C_{14}H_{28}C_8F_{17}$; $C_{10}F_{21}C_2H_4C_{10}F_{21}$; $C_{10}F_{21}C_2H_4C_{10}F_{21}$; $C_8F_{17}C_8H_{16}CH=CHC_2H_4C_6F_{13}$; $(CF_3)_2CFC_8H_{16}CF(CF_3)_3$; $(CF_3)_2CFC_2F_4C_8H_{16}C_2F_4CF(CF_3)_3$; and $(CF_3)_2CF(CF_2)_7C_8H_{16}(CF_2)_7CF(CF_3)_2$.

7. A magnetic recording medium according to claim 1, wherein said surface layer is present in a coating weight of from 1.0 to 50 mg/m².

8. A magnetic recording medium according to claim 7, wherein said surface layer is present in a coating weight of from 3 to 30 mg/m².

* * * * *